(12) United States Patent
Parson et al.

(10) Patent No.: US 11,255,002 B2
(45) Date of Patent: Feb. 22, 2022

(54) CORROSION RESISTANT ALLOY FOR EXTRUDED AND BRAZED PRODUCTS

(71) Applicant: Rio Tinto Alcan International Limited, Montreal (CA)

(72) Inventors: Nicholas C. Parson, Jonquière (CA); Raynald Guay, Jonquière (CA)

(73) Assignee: Rio Tinto Alcan International Limited, Montreal (CA)

( * ) Notice: Subject to any disclaimer, the term of this patent is extended or adjusted under 35 U.S.C. 154(b) by 138 days.

(21) Appl. No.: 16/097,014

(22) PCT Filed: Apr. 10, 2017

(86) PCT No.: PCT/CA2017/050435
§ 371 (c)(1),
(2) Date: Oct. 26, 2018

(87) PCT Pub. No.: WO2017/185173
PCT Pub. Date: Nov. 2, 2017

(65) Prior Publication Data
US 2019/0127823 A1  May 2, 2019

Related U.S. Application Data

(60) Provisional application No. 62/329,272, filed on Apr. 29, 2016.

(51) Int. Cl.
C22C 21/00 (2006.01)
B23K 1/00 (2006.01)
B21C 23/00 (2006.01)
B23K 103/10 (2006.01)

(52) U.S. Cl.
CPC ............ C22C 21/00 (2013.01); B21C 23/002 (2013.01); B23K 1/00 (2013.01); B23K 2103/10 (2018.08)

(58) Field of Classification Search
CPC ......... C22C 21/00; B21C 23/002; B23K 1/00; B23K 103/00
See application file for complete search history.

(56) References Cited

U.S. PATENT DOCUMENTS

| | | | |
|---|---|---|---|
| 6,451,453 B1 | 9/2002 | Kucza et al. | |
| 6,638,376 B2 | 10/2003 | Hasegawa et al. | |
| 6,638,377 B2 | 10/2003 | Koyama et al. | |
| 7,732,059 B2 | 6/2010 | Ren et al. | |
| 7,781,071 B2 | 8/2010 | Parson et al. | |
| 8,025,748 B2 | 9/2011 | Parson et al. | |
| 2001/0025676 A1 | 10/2001 | Taguchi et al. | |
| 2002/0007881 A1 | 1/2002 | Daaland et al. | |
| 2003/0102060 A1 | 6/2003 | Daaland et al. | |
| 2005/0106410 A1 | 5/2005 | Jiang et al. | |
| 2013/0292012 A1* | 11/2013 | Okaniwa | F28F 21/084 148/688 |
| 2016/0153073 A1 | 6/2016 | Parson et al. | |
| 2017/0260612 A1 | 9/2017 | Janssen et al. | |
| 2019/0127823 A1* | 5/2019 | Parson | C22C 21/00 |

FOREIGN PATENT DOCUMENTS

| | | |
|---|---|---|
| CN | 101956102 A | 1/2011 |
| EP | 1155157 A1 | 11/2001 |
| EP | 1158063 A1 | 11/2001 |
| EP | 1349965 A2 | 10/2003 |
| EP | 1746174 A1 | 1/2007 |
| EP | 2330226 A1 | 6/2011 |
| EP | 2841610 A1 | 3/2015 |
| EP | 3026134 A1 | 6/2016 |
| WO | 9918250 A1 | 4/1999 |
| WO | 2009149542 A1 | 12/2009 |

OTHER PUBLICATIONS

Nov. 18, 2019—(EP) Extended Search Report—App 17788454.1.
International Search Report for Application No. PCT/CA2017/050435, dated Jul. 25, 2017.

* cited by examiner

Primary Examiner — Scott R Kastler
(74) Attorney, Agent, or Firm — Banner & Witcoff, Ltd.

(57) ABSTRACT

An aluminum alloy for making an extruded and brazed aluminum product, the aluminum alloy comprising, in weight percent, 0.10-0.20 Zn to improve corrosion resistance, 0.9-1.2 Mn, 0.03-0.10 Mg, the sum of Mg and Mn being at least 0.99 to maintain or improve strength, 0.15 to 0.30 Fe to control grain size, up to 0.15 Si, up to 0.03 Cu, up to 0.04 Ti, the balance being aluminum and unavoidable impurities. The alloy may be in the form of extrusion ingots or extruded and brazed aluminum products. A process for making an extruded and brazed aluminum product from the alloy involves homogenizing, extruding, optionally working, and brazing the alloy to form the product.

17 Claims, No Drawings

CORROSION RESISTANT ALLOY FOR EXTRUDED AND BRAZED PRODUCTS

CROSS-REFERENCE TO RELATED APPLICATIONS

This application is a U.S. National Phase filing of International Application No. PCT/CA2017/050435, filed on Apr. 10, 2017, which claims priority from U.S. provisional patent application 62/329,272 filed on Apr. 29, 2016, and this application claims priority to and the benefit of both of such prior applications, which are herewith incorporated by reference in their entireties.

TECHNOLOGICAL FIELD

The present disclosure relates to aluminum alloys for making extruded and brazed aluminum products having improved resistance to corrosion while maintaining their tensile properties, their extrudability and brazeability properties as well as exhibiting an appropriate grain size to promote good formability.

BACKGROUND

The AA3003 aluminum alloy is extensively used for making extruded, optionally drawn, and brazed products. The applications of the AA3003 aluminum alloy are however limited due to its poor resistance to corrosion. Importantly, AA3003 has insufficient corrosion resistant to meet the increasingly stringent requirements of the automotive and air conditioning industries.

It would be highly desirable to be provided with an aluminum alloy for making extruded and brazed aluminum products having, when compared to extruded and brazed aluminum products made from the AA3003 aluminum alloy, improved corrosion resistance while maintaining (or improving) tensile properties and acceptable post-brazed grain size.

BRIEF SUMMARY

The aluminum alloys of the present disclosure are for making extruded and brazed products having improved corrosion resistance (provided by a deliberate addition of Zn and optionally a low Cu content) while maintaining tensile properties (provided by a deliberate addition of Mn and Mg) and acceptable (post-brazed) grain size (provided by a deliberate addition of Fe and optionally a low Si content). The present disclosure also provides the aluminum alloy in the form of extrusion ingots, extruded and brazed products made from the aluminum alloy as well as processes for making extruded and brazed aluminum products from the aluminum alloy.

In a first aspect, the present disclosure provides an aluminum alloy for making an extruded and brazed aluminum product. The aluminum alloy comprising, in weight percent:
  up to about 0.15 of Si;
  between about 0.15 to about 0.30 of Fe;
  between about 0.9 to about 1.2 Mn;
  between about 0.03 and about 0.10 Mg;
  between about 0.10 and about 0.20 Zn;
  up to about 0.03 Cu;
  up to about 0.04 Ti; and
  the balance being aluminum and unavoidable impurities;
  wherein (Mg+Mn) (e.g., the combined weight percent of both Mg and Mn) is higher than about 0.99.

In an embodiment, the aluminum alloy comprises up to about 0.12 Si. In still another embodiment, the aluminum alloy comprises at least about 0.20 Fe. In yet another embodiment, the aluminum alloy can comprise between about 0.9 and about 1.1 Mn. In yet a further embodiment, the aluminum alloy can comprise between about 0.06 and about 0.10 Mg. In still a further embodiment, the aluminum alloy can comprise between about 0.12 to about 0.16 Zn. In still a further embodiment, the aluminum alloy can comprise up to about 0.01 Cu. In an embodiment, the aluminum alloy can comprise up to about 0.03 Ti. In another embodiment, (Mg+Mn) is equal to or higher than about 1.0. In yet another embodiment, (Mg+Mn) is higher than about 1.0. In the context of the present disclosure, the term "about" means that the recited numerical value is part of a range that varies within standard experimental error.

In a second aspect, the present disclosure provides an extrusion ingot comprising the aluminum alloy described herein for making an extruded and brazed aluminum product. The present disclosure also provides a process for making an extrusion ingot comprising providing the aluminum alloy described herein and casting the aluminum alloy into an extrusion ingot.

In a third aspect, the present disclosure provides an extruded and brazed aluminum product comprising the aluminum alloy described herein.

In a fourth aspect, the present disclosure provides a process for making an extruded and brazed aluminum product. Broadly, the process comprises (a) homogenizing the aluminum alloy described herein into an homogenized aluminum alloy; (b) extruding the homogenized aluminum alloy into an extruded aluminum product; (c) optionally working the extruded aluminum product into a worked aluminum product; and (d) brazing the extruded aluminum product or the worked aluminum product into the extruded and brazed aluminum product. In an embodiment, the process can further comprise providing the aluminum alloy of step (a) as an extrusion ingot. In still another embodiment, the process can further comprise conducting the homogenizing of step (b) at a temperature between 580° C. and 620° C. In still another embodiment, step (b) further comprises a cooling step at about 400° C./h or less. In yet another embodiment, step (d) further comprises drawing the extruded aluminum product (when the worked aluminum product is a drawn aluminum product).

In a fifth aspect, the present disclosure provides an extruded and brazed aluminum product made by the process described herein.

DETAILED DESCRIPTION

In accordance with the present disclosure, there are provided aluminum alloys for making extruded and brazed aluminum products (which can be optionally drawn). The aluminum alloys of the present disclosure limit corrosion, preserve tensile properties and provide an appropriate grain size in the aluminum products comprising same. The aluminum alloys comprise Zn for improving corrosion resistance in the resulting extruded and brazed aluminum products. The aluminum alloys preferably comprise between at least about 0.10 Zn and no more than about 0.20 Zn to achieve an increase in corrosion resistance in the resulting extruded and brazed aluminum products. Optionally, the aluminum alloys comprise a low Cu content for promoting corrosion resistance in the resulting extruded and brazed aluminum products. The aluminum alloys comprise a combination of Mn and Mg for maintaining or improving the tensile properties (and especially ultimate tensile strength) of the resulting extruded and brazed aluminum product. The aluminum alloys preferably comprise at least about 0.9 Mn and at most about 1.2 Mn to achieve the maintenance or the increase in tensile properties in the resulting extruded and brazed aluminum products. The aluminum alloys preferably comprise at least about 0.03 Mg and no more than about 0.10 Mg to achieve the maintenance or the increase in tensile properties in the resulting extruded and brazed products. The aluminum alloys preferably comprise a combined weight percent of both Mg and Mn equal to or higher than about 0.99. The aluminum alloy also comprises Fe to achieve the maintenance or the decrease in grain size in the resulting extruded and brazed aluminum products. The aluminum alloys preferably comprise at least about 0.15 Fe and no more than about 0.30 Fe to achieve the maintenance or the decrease in grain size in the resulting extruded and brazed aluminum products. Optionally, the aluminum alloys comprise a low Si content for promoting an appropriate grain size in the resulting extruded and brazed aluminum products. The present disclosure also provides the aluminum alloy in the form of ingots or billets, extruded and brazed aluminum products made from the aluminum alloy as well as processes for making extruded and brazed aluminum products from the aluminum alloy.

Aluminum Alloys and Ingots

The present disclosure provides an aluminum alloy (that may optionally be in the form of an ingot) capable of limiting corrosion (filiform, pitting and/or general corrosion) in an aluminum product comprising same. In an embodiment, the aluminum alloy is capable of limiting pitting corrosion in an aluminum product comprising same, when compared to another aluminum product comprising another aluminum alloy (AA3003 for example). In the context of the present disclosure, the expression "limiting corrosion" refers to the ability of reducing or delaying the progress of corrosion in a product made from the aluminum alloy of the present disclosure when compared to a corresponding product made from a different aluminum alloy (AA3003 for example).

The aluminum alloys of the present disclosure comprise zinc (Zn) as a deliberate addition to reduce or delay the onset of corrosion (e.g., pitting corrosion) in an aluminum alloy comprising same. If Zn is present at a weight percentage below about 0.10, the aluminum product comprising the alloy fails to exhibit a substantive reduction in pitting corrosion (e.g., see alloys B, D, E and G in Example I). On the other hand, if Zn is present at a weight percentage above about 0.20, the aluminum product comprising the alloy will exhibit an increase or an earlier onset of general corrosion. As such, the aluminum alloys of the present disclosure comprise at least about 0.10, 0.11, 0.12, 0.13, 0.14, 0.15, 0.16, 0.17, 0.18 or 0.19 and/or at most about 0.20, 0.19, 0.18, 0.17, 0.16, 0.15, 0.14, 0.13, 0.12 or 0.11 of Zn (in weight percent). In an embodiment, the aluminum alloys of the present disclosure comprise at least about 0.10, 0.11, 0.12, 0.13, 0.14, 0.15, 0.16, 0.17, 0.18 or 0.19 and at most about 0.20, 0.19, 0.18, 0.17, 0.16, 0.15, 0.14, 0.13, 0.12 or 0.11 of Zn (in weight percent). In still another embodiment, the aluminum alloys of the present disclosure comprise between about 0.10 and about 0.20 Zn (in weight percent). In yet another embodiment, the aluminum alloys of the present disclosure comprise at least about 0.12, 0.13, 0.14, 0.15, 0.16, 0.17, 0.18 or 0.19 and/or at most about 0.20, 0.19, 0.18, 0.17, 0.16, 0.15, 0.14 or 0.13 of Zn (in weight percent). In yet a further embodiment, the aluminum alloys of the present disclosure comprise at least about 0.12, 0.13, 0.14, 0.15, 0.16, 0.17, 0.18 or 0.19 and at most about 0.20, 0.19, 0.18, 0.17, 0.16, 0.15, 0.14 or 0.13 of Zn (in weight percent). In still yet another embodiment, the aluminum alloys of the present disclosure comprise between about 0.12 and about 0.16 of Zn (in weight percent).

In some embodiments, the aluminum alloy of the present disclosure can optionally comprise copper (Cu) which is usually found as an impurity. In the context of the present disclosure, Cu, at reduced levels, can be involved in reducing or delaying the onset of corrosion (e.g., pitting corrosion) in an aluminum product comprising same. In the aluminum alloy of the present disclosure, Cu can be present at a maximal weight percent of about 0.03. As such, the aluminum alloys of the present disclosure can include up to about 0.03, 0.02 or 0.01 Cu (in weight percent). In an embodiment, the aluminum alloys of the present disclosure can comprise up to about 0.01 Cu (in weight percent).

The aluminum products made from the aluminum alloys of the present disclosure exhibit an acceptable grain size (e.g., medium or fine). In an aluminum product, grain size can be determined qualitatively (e.g., coarse, medium or fine) or quantitatively (e.g., by measuring cold-worked and post-brazed (CWPB) grain size). In some embodiments, an extruded and brazed aluminum product having an acceptable grain size will have a CWPB value equal to or less than 150μ, 140μ, 130μ, 120μ, 110μ or 100μ. In still another embodiment, the extruded and brazed aluminum product has a CWPB value equal to or less than 100μ. In order to adjust the grain size in the resulting aluminum product, a deliberate addition of Fe is made to the aluminum alloy. If Fe is present, in the aluminum alloy, at a weight percentage below about 0.15, the aluminum product comprising the aluminum alloy fails to exhibit an acceptable grain size (e.g., see alloys F and G in Example I). On the other hand, if Fe is present, in the aluminum alloy, at a weight percentage above about 0.30, the aluminum product comprising the aluminum alloy will exhibit an increase or an earlier onset of pitting corrosion (e.g., see alloy B in Examples I and II). As such, the aluminum alloys of the present disclosure comprise at least about 0.15, 0.16, 0.17, 0.18, 0.19, 0.20, 0.21, 0.22, 0.23, 0.24, 0.25, 0.26, 0.27, 0.28, 0.29 and/or at most about 0.30, 0.29, 0.28, 0.27, 0.26, 0.25, 0.24, 0.23, 0.22, 0.21, 0.20, 0.19, 0.18, 0.17 or 0.16 of Fe (in weight percent). In an embodiment, the aluminum alloys of the present disclosure comprise at least about 0.15, 0.16, 0.17, 0.18, 0.19, 0.20, 0.21, 0.22, 0.23, 0.24, 0.25, 0.26, 0.27, 0.28, 0.29 and at most about 0.30, 0.29, 0.28, 0.27, 0.26, 0.25, 0.24, 0.23, 0.22, 0.21, 0.20, 0.19, 0.18, 0.17 or 0.16 of Fe (in weight percent). In still another embodiment, the aluminum alloys of the present disclosure comprise between about 0.15 and about 0.30 Fe (in weight percent). In yet another embodiment, the aluminum alloys of the present disclosure comprise at least about 0.15, 0.16, 0.17, 0.18, 0.19 or 0.20 of Fe (in weight percent). In still yet another embodiment, the aluminum alloys of the present disclosure comprise at least about 0.20 Fe (in weight percent). In yet a further embodiment, the aluminum alloys of the present disclosure comprise at most about 0.30, 0.29, 0.28, 0.27, 0.26, 0.25, 0.24, 0.23, 0.22 or 0.21 of Fe (in weight percent). In a further embodiment, the aluminum alloys of the present disclosure comprise between about 0.20 and about 0.24 Fe. In yet another embodiment, the aluminum alloys of the present disclosure comprise at most about 0.25 of Fe (in weight percent).

The aluminum alloys of the present disclosure can optionally include silicon (Si) usually as an impurity. Si reduces the solubility of Mn and can promote the formation of fine dispersoid particles which can inhibit recrystallization during extrusion and brazing and ultimately result in a coarse grain size which is detrimental to formability and corrosion resistance In the context of the present disclosure, Si is provided at a sufficiently low content to promote adequate grain size in the resulting extruded and brazed aluminum product comprising the aluminum alloy. The aluminum alloys of the present disclosure thus comprise a maximum of (e.g., up to) about 0.15 Si (in weight percent). In an embodiment, the aluminum alloys of the present disclosure comprise a maximum of (e.g., up to) about 0.14, 0.13, 0.12, 0.11, 0.10, 0.09, 0.08, 0.07, 0.06 or 0.05 Si (in weight percent). For example, the aluminum alloys of the present disclosure can comprise at least about 0.05, 0.06, 0.07, 0.08, 0.09, 0.10, 0.11, 0.12, 0.13 or 0.14 and/or at most about 0.15, 0.14, 0.13, 0.12, 0.11, 0.10, 0.09, 0.08, 0.07 or 0.06 Si (in weight percent). In a further embodiment, the aluminum alloys of the present disclosure can comprise at least about 0.05, 0.06, 0.07, 0.08, 0.09, 0.10, 0.11, 0.12, 0.13 or 0.14 and at most about 0.15, 0.14, 0.13, 0.12, 0.11, 0.10, 0.09, 0.08, 0.07 or 0.06 Si (in weight percent). In yet another embodiment, the aluminum alloys of the present disclosure comprise between about 0.05 and about 0.15 Si (in weight percent). In yet another embodiment, the aluminum alloys of the present disclosure comprise a maximum of (e.g., up to) about 0.14, 0.13, 0.12, 0.11 or 0.10 Si (in weight percent). In still another embodiment, the aluminum alloys of the present disclosure comprise a maximum of (e.g., up to) about 0.12 Si (in weight percent). In yet another embodiment, the aluminum alloys of the present disclosure comprise a maximum of (e.g., up to) about 0.10 Si (in weight percent).

Because the aluminum products made from the aluminum alloys are intended to be brazed and used in structural applications, it is necessary that some of the alloying elements of the aluminum alloys of the present disclosure promote adequate tensile properties and also allow brazing of the resulting products (e.g., herein referred to as brazeability). Consequently, the aluminum alloys of the present disclosure comprise both magnesium (Mg) and manganese (Mn) as deliberate additions to the aluminum alloys of the present disclosure to provide adequate tensile properties and brazeability. As it is known in the art, "tensile properties" refer to the elongation property as well as the "strength" of an aluminum product. The "strength" can be measured as its ultimate tensile strength and/or yield strength. In the context of the present disclosure, the strength of an aluminum product is determined in an aluminum product that has been extruded and brazed or at least submitted to a simulated brazing (and optionally drawn). In an embodiment, the aluminum alloys of the present disclosure provide, in an extruded and brazed (or braze-stimulated) aluminum product comprising same, an ultimate tensile strength (UTS) of at least about 105 MPa or at least about 100 MPa. To achieve such strength, it is important that the aluminum alloy comprises both Mg and Mn. Without wishing to be bound to theory, the presence of Mg is believed to improve brazeability by reacting with the brazing flux and reducing the fluidity of the filler metal such that defects caused by pooling of filler metal by gravity or capillary action are reduced. The presence of high levels of Mg (e.g., higher than about 0.10) or Mn (e.g., higher than about 1.2) is believed to increase the high temperature flow stress, increase extrusion pressures and decrease extrudability and can excessively reduce the activity of the flux during brazing such that successful joints cannot be made.

The aluminum alloys of the present disclosure comprise at least about 0.03, 0.04, 0.05, 0.06, 0.07, 0.08 or 0.09 and/or at most about 0.10, 0.09, 0.08, 0.07, 0.06 0.05 or 0.04 Mg (in weight percentage). In an embodiment, the aluminum alloys of the present disclosure comprise at least about 0.03, 0.04, 0.05, 0.06, 0.07, 0.08 or 0.09 and at most about 0.10, 0.09, 0.08, 0.07, 0.06 0.05 or 0.04 Mg (in weight percentage). In yet another embodiment, the aluminum alloys of the present disclosure comprise between about 0.03 and about 0.10 of Mg (in weight percent). In an embodiment, the aluminum alloys of the present disclosure comprise at least about 0.06, 0.07, 0.08 or 0.09 and/or at most about 0.10, 0.09, 0.08 or 0.07 of Mg (in weight percent). In an embodiment, the aluminum alloys of the present disclosure comprise at least about 0.06, 0.07, 0.08 or 0.09 and at most about 0.10, 0.09, 0.08 or 0.07 of Mg (in weight percent). In yet another embodiment, the aluminum alloys of the present disclosure comprise between about 0.06 and about 0.10 of Mg (in weight percent).

The aluminum alloys of the present disclosure comprise at least about 0.9, 1.0 or 1.1 and/or at most about 1.2, 1.1 or 1.0 of Mn (in weight percent). In an embodiment, the aluminum alloys of the present disclosure comprise at least about 0.9, 1.0 or 1.1 and at most about 1.2, 1.1 or 1.0 of Mn (in weight percent). In yet another embodiment, the aluminum alloys of the present disclosure comprise between about 0.9 and about 1.2 of Mn (in weight percent). In an embodiment, the aluminum alloys of the present disclosure comprise at least about 0.9, 1.0 or 1.1 and/or at most about 1.2, 1.1 or 1.0 of Mn (in weight percent). In an embodiment, the aluminum alloys of the present disclosure comprise at least about 0.9, 1.0 or 1.1 and at most about 1.2, 1.1 or 1.0 of Mn (in weight percent). In yet another embodiment, the aluminum alloys of the present disclosure comprise between about 0.9 and about 1.1 of Mn (in weight percent).

In the aluminum alloys of the present disclosure, the combined weight percent of both Mg and Mn (e.g., "Mg+Mn") is higher than about 0.92, such as, for example, equal to or higher than about 0.99. In some embodiments, the combined weight percent of Mg and Mn is associated with an ultimate tensile strength of at least about 100 MPa and, in some further embodiments, to an ultimate tensile strength of at least about 105 MPa in extruded and brazed aluminum products made from such aluminum alloys. For example, the combined weight percent of both Mg and Mn can be at least about 0.92, 0.93, 0.94, 0.95, 0.96, 0.97, 0.98, 0.99 1.00, 1.01, 1.02 or 1.03. In still another embodiment, the combined weight percent of Mg and Mn can be equal to or higher than about 1.0. In an embodiment, the combined weight percent of Mg and Mn can be at least about 1.03.

The aluminum alloys of the present disclosure can optionally include titanium (Ti) as a deliberate addition. In the context of the present disclosure, Ti can act as a grain refiner. In an embodiment, the aluminum alloys of the present disclosure can comprise at most 0.04, 0.03, 0.02 or 0.01 Ti (in weight percent). In still another embodiment, the aluminum alloys of the present disclosure can comprise a maximum of 0.04 Ti (in weight percentage). In yet another embodiment, the aluminum alloys of the present disclosure can comprise a maximum of 0.03 Ti (in weight percentage). In some embodiments, Ti can be used in combination with boron (B) when used a grain refiner. For example Al-5 wt % Ti-1 wt % B is a commonly used grain refiner material added to aluminum and can be used as a grain refiner material in the aluminum alloys of the present disclosure.

The balance of the aluminum alloys of the present disclosure is aluminum and unavoidable impurities. Such impurity includes, but is not limited to, nickel (Ni). In an embodiment, each impurity is present, in weight percent, at a maximum of about 0.05 and the total unavoidable impurities is present, in weight percent, at a maximum of less than about 0.15. In another embodiment, when Ni is present as an impurity, its weight percent in the aluminum alloy is equal to or less than 0.01.

The present disclosure also provide extrusion ingots comprising the aluminum alloys described herein. Preferably, the ingots are intended to be used in an extrusion process to make extruded and brazed aluminum products.

Aluminum Products and Process for Making Same

The present disclosure further provides an aluminum product comprising the aluminum alloy described herein. The aluminum product has an improved resistance to corrosion, especially pitting corrosion, than another aluminum product made from an aluminum alloy having less than about 0.10 or more than about 0.20 Zn. The aluminum product also exhibits an acceptable grain size for downstream applications. The aluminum product also exhibits an increased tensile property, especially an increased ultimate tensile strength, and adequate brazeability when compared to another aluminum product made from an aluminum alloy having less than about 0.9 or more than about 1.2 Mn, having less than about 0.03 or more than about 0.10 Mg or having a combined Mg and Mn content equal to or lower than about 0.99. The aluminum product also exhibits higher extrudability when compared to another aluminum product made from an aluminum alloy having more than about 1.2 Mn and/or 0.10 Mg.

The aluminum product is an extruded and brazed aluminum product which can optionally be drawn. The aluminum products of the present disclosure have a minimal ultimate tensile strength, as measured after extrusion and brazing, of at least about 105 MPa. The aluminum product can be a tubing, such as, for example, a heat exchanger tube. In some embodiments, the aluminum product can be used in thick gauge applications, such as, for example, as manifolds or connector tubes. As indicated above, in some embodiments, the extruded and brazed aluminum products of the present disclosure can have a grain size (as measured as CWPB) equal to or less than about 150μ (e.g., 100μ for example) and/or and ultimate tensile strength of at least 100 MPa (e.g., 105 MPa for example).

The present disclosure also provides a process for making the aluminum products described herein. Firstly, the aluminum alloy described herein (which can be provided as an extrusion ingot) is homogenized to provide an homogenized aluminum alloy. In order to provide an homogenized aluminum alloy, the aluminum alloy is first heated (for example at a temperature between 580° C. and 620° C. for a period of at least 1 hour (h), 2 h, 3 h, 4 h, 5 h, 6 h, 7 h, 8 h or more) and is then cooled down (for example at a rate of 400° C./h or less). In an embodiment, the aluminum alloy is first heated at a temperature between about 560° C. to 600° C. for a period of 2 h to 6 h and then cooled down at a rate equal to or less than 400° C./h. Secondly, once the homogenized aluminum alloy is provided, it is submitted to extrusion to provide an extruded product. Prior to being brazed, the aluminum product can optionally be worked (for example rolled or drawn) into a worked aluminum product (for example a rolled aluminum product or a drawn aluminum product). Once the extruded aluminum product or the worked aluminum product has been made, it is subjected to a brazing step to provide an extruded and brazed aluminum product. Optionally, the process can include providing the aluminum alloy described herewith prior to homogenization.

The present invention will be more readily understood by referring to the following examples which are given to illustrate the invention rather than to limit its scope.

Example I—Modulation in Corrosion Resistance and Grain Size

The example was designed to develop an aluminum alloy for non-drawn applications, as well as to determine to their applicability for thick gauge cold drawn and brazed products.

The alloy compositions listed in Table 1 were direct chill (DC) cast as 101-mm diameter billets. These were cut into billets and homogenized to one of two homogenization practices: (i) 4 hours/620° C. followed by cooling at 300° C./hour; or (ii) 4 hours/580° C. followed by cooling at 300° C./hour. These billets were extruded into a 3×42-mm strip using a billet temperature of 480° C. and a ram speed of 18 mm/s. The strip was then cold rolled to 1.2 mm of thickness, corresponding to a cold reduction of 60%. The material was given a simulated brazing cycle of 2.5 min/600° C. A flat faced die was used for the extrusion to avoid contamination between the alloy variants, which could otherwise influence subsequent property testing. After brazing, the longitudinal grain size was measured along with tensile properties and corrosion potential (ASTM G69). Coupons produced from billets homogenized at 580° C. were also exposed in the SWAAT test (ASTM G85A3) for 20 days, and mean pit depths for the six deepest pits per coupon were measured according to ASTM G46. The control alloy B was homogenised at 620° C., for the corrosion testing, as this is a typical commercial practice for this alloy. The grain sizes were measured by the linear intercept method and refer to grain length in the extrusion or drawing direction (e.g., cold-worked post-brazed grain size or CWPB). The electrochemical corrosion potential (known as $E_{corr}$) was measured according to ASTM G69. The results are summarised in Table 1.

TABLE 1

Elemental composition and characteristics of the different alloys tested in this Example.

| Alloy | Cu | Fe | Mn | Mg | Ni | Si | Ti | Zn | Homo. Temp ° C. | CWPB μ | UTS MPa | 20-day pit depth μ | $E_{corr}$ mV |
|---|---|---|---|---|---|---|---|---|---|---|---|---|---|
| A | 0.003 | 0.11 | 0.98 | <.001 | 0.008 | 0.09 | 0.02 | 0.021 | 580 | 121 | 89 | 480 | −720 |
|   |   |   |   |   |   |   |   |   | 620 | 98 | 100 |   | −725 |
| B[1] | 0.09 | 0.56 | 1.05 | 0.01 | 0.007 | 0.25 | 0.016 | 0.005 | 580 | 84 | 105 |   | −725 |
|   |   |   |   |   |   |   |   |   | 620 | 47 | 113 | 675 | −726 |
| C | 0.004 | 0.22 | 0.53 | 0.13 | 0.006 | 0.13 | 0.019 | 0.21 | 580 | 54 | 97 | 524 | −752 |
|   |   |   |   |   |   |   |   |   | 620 | 64 | 97 |   | −752 |

TABLE 1-continued

Elemental composition and characteristics of the different alloys tested in this Example.

| Alloy | Cu | Fe | Mn | Mg | Ni | Si | Ti | Zn | Homo. Temp °C. | CWPB μ | UTS MPa | 20-day pit depth μ | $E_{corr}$ mV |
|---|---|---|---|---|---|---|---|---|---|---|---|---|---|
| D | 0.001 | 0.1 | 0.63 | 0.004 | 0.006 | 0.09 | 0.02 | 0.003 | 580 | 109 | 84 | 529 | −741 |
|   |   |   |   |   |   |   |   |   | 620 | 105 | 84 |   | −742 |
| E | 0.001 | 0.3 | 0.61 | 0.002 | 0.006 | 0.09 | 0.016 | 0.003 | 580 | 53 | 93 | 608 | −736 |
|   |   |   |   |   |   |   |   |   | 620 | 47 | 97 |   | −735 |
| F | 0.001 | 0.11 | 0.83 | <.001 | 0.007 | 0.16 | 0.15 | 0.17 | 580 | 212 | 94 | 346 | −730 |
|   |   |   |   |   |   |   |   |   | 620 | 160 | 95 |   | −731 |
| G | 0.002 | 0.11 | 0.79 | <.001 | 0.006 | 0.23 | 0.12 | 0.004 | 580 | 329 | 102 | 576 | −726 |
|   |   |   |   |   |   |   |   |   | 620 | 195 | 90 |   | −731 |

CWPB: cold-worked post-brazed grain size;
UTS: ultimate tensile strength.
[1]This alloy corresponds to AA3003 is a standard commercial alloy used for thick gauge heat exchanger tube applications currently and represents the control in the present example.

As shown in table 1, alloy B exhibited the deepest pitting and all of the other tested alloys gave some improvement in comparison. Alloy E provided the most modest improvement in resistance to pitting corrosion. In addition, although alloy F, with deliberate Zn and Ti additions, gave the best corrosion resistance, it provided a post brazed grain size higher than 150μ, which is not acceptable. Alloy G also provided a post brazed grain size target of higher than 150μ. Alloys A, C, D and E also fail to provide an aluminum alloy having an ultimate tensile strength higher than 100 MPa.

Alloy D exhibited inadequate strength (e.g., below 105 MPa) and, while having a grain size lower than the target of 150μ, it exhibited significantly coarser grain than alloy B. The Fe addition in alloy E (when compared to alloy D) improved the grain size, but was also detrimental to corrosion resistance.

Alloy C met the required grain size but failed to give a sufficient improvement in corrosion resistance or an appropriate strength.

Example II—Optimization in Corrosion Resistance and Grain Size

The objective of this example was to identify an alloy composition with superior corrosion resistance to AA3003 with no significant loss of post brazed strength or formability (which is mainly controlled by the post brazed grain size).

The alloy compositions in Table 2 were DC cast as 101-mm diameter ingots. The same test protocols, as Example I, were followed with the exception that corrosion testing was performed for low and high temperature homogenization cycles. The test results are summarized in Table 2.

TABLE 2

Elemental composition and characteristics of the different alloys tested in this Example.

| Alloy Type | Cu | Fe | Mn | Mg | Ni | Si | Ti | Zn | Homo. Temp °C. | Extruded Grain Structure | CWPB μ | UTS MPa | 20-day pit depth μ | $E_{corr}$ mV |
|---|---|---|---|---|---|---|---|---|---|---|---|---|---|---|
| H | 0.002 | 0.20 | 0.77 | 0.03 | 0.005 | 0.09 | 0.016 | 0.11 | 580 | fine | 49 | 102 | 308 | −734 |
|   |   |   |   |   |   |   |   |   | 620 | fine | 63 | 99 | 302 | −725 |
| I | 0.002 | 0.21 | 1.00 | 0.03 | 0.005 | 0.09 | 0.02 | 0.12 | 580 | medium | 48 | 106 | 319 | −725 |
|   |   |   |   |   |   |   |   |   | 620 | fine | 68 | 108 | 285 | −725 |
| J | 0.002 | 0.20 | 0.98 | 0.01 | 0.006 | 0.22 | 0.019 | 0.13 | 580 | coarse | 75 | 100 | 358 | −750 |
|   |   |   |   |   |   |   |   |   | 620 | fine | 53 | 106 | 326 | −759 |
| K | 0.002 | 0.20 | 0.98 | 0.02 | 0.007 | 0.08 | 0.015 | 0.22 | 580 | medium | 49 | 103 | 317 | −734 |
|   |   |   |   |   |   |   |   |   | 620 | fine | 52 | 106 | 317 | −738 |
| L | 0.002 | 0.24 | 0.97 | 0.09 | 0.006 | 0.08 | 0.014 | 0.15 | 580 | medium | 43 | 111 | 360 | −727 |
|   |   |   |   |   |   |   |   |   | 620 | fine | 51 | 109 | 301 | −736 |
| M | 0.08 | 0.24 | 0.98 | 0.01 | 0.006 | 0.09 | 0.015 | 0.14 | 580 | medium | 59 | 112 | 294 | −714 |
|   |   |   |   |   |   |   |   |   | 620 | fine | 54 | 110 | 371 | −723 |
| B[1] | 0.09 | 0.56 | 1.05 | 0.01 | 0.007 | 0.25 | 0.016 | 0.005 | 580 | medium | 84 | 105 |   | −725 |
|   |   |   |   |   |   |   |   |   | 620 | fine | 47 | 113 | 526 | −726 |

CWPB: cold-worked post-brazed grain size;
UTS: ultimate tensile strength.
[1]This alloy corresponds to AA3003 is a standard commercial alloy used for thick gauge heat exchanger tube applications currently and represents the control in the present example.

The H alloy was not capable of meeting the strength target of 105 MPa. The J alloy gave coarse grain in the extruded condition, when homogenized at low temperature, which could limit its drawability. The K alloy gave borderline strength when homogenized at 580° C.

The remaining alloys I, J, L and M met the strength and corrosion resistance targets, but alloy M gave inferior corrosion resistance when homogenised at 620° C. The alloy I gave the best overall performance.

Alloys B, I and M were DC cast as 101-mm diameter ingots. The same test protocols, as Example I, were followed except that cold reductions of 20, 40 and 60% were applied before brazing. The test results are summarized in Table 3.

TABLE 3

Cold-worked post-brazed grain size (μ) for alloys I, B and M homogenized at different temperatures.

| | L 3.5 h/580° C. | B 4 h/620° C. | L 2 h/580° C. | I 2 h/580° C. |
|---|---|---|---|---|
| 20 | 350 | 73 | 450 | 2000 |
| 40 | 98 | 41 | 100 | 177 |
| 60 | 59 | 47 | 57 | 91 |

The standard AA3003 was the only alloy to meet the grain size requirement of <100 when only a 20% cold reduction was applied. For more typical cold reductions of 40-60%, Alloy L (0.09% Mg) met the grain size target for long and short homogenisation times at 580° C. However, alloy 1 (0.03% Mg) gave a grain size well in excess of the target.

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. An aluminum alloy for making an extruded and brazed aluminum product, the aluminum alloy comprising, in weight percent:
   up to about 0.15 of Si;
   between about 0.15 to about 0.30 of Fe;
   between about 0.9 to about 1.2 Mn;
   between about 0.03 and about 0.10 Mg;
   between about 0.10 and about 0.20 Zn;
   up to about 0.03 Cu;
   up to about 0.04 Ti; and
   the balance being aluminum and unavoidable impurities;
   wherein (Mg+Mn) is equal to or higher than about 0.99; and
   wherein the aluminum alloy in the extruded and brazed aluminum product has a greater corrosion resistance than a control extruded and brazed aluminum product made from aluminum alloy AA3003.

2. The aluminum alloy of claim 1, comprising up to about 0.12 Si.

3. The aluminum alloy of claim 1, comprising at least about 0.20 Fe.

4. The aluminum alloy of claim 1 comprising between about 0.9 and about 1.1 Mn.

5. The aluminum alloy of claim 1, comprising between about 0.06 and about 0.10 Mg.

6. The aluminum alloy of claim 1, comprising between about 0.12 to about 0.16 Zn.

7. The aluminum alloy of claim 1, comprising up to about 0.01 Cu.

8. The aluminum alloy of claim 1, comprising up to about 0.03 Ti.

9. The aluminum alloy of claim 1, wherein (Mg+Mn) is equal to or higher than about 1.0.

10. An extrusion ingot comprising the aluminum alloy of claim 1 for making an extruded and brazed aluminum product.

11. An extruded and brazed aluminum product comprising the aluminum alloy of claim 1.

12. A process for making an extruded and brazed aluminum product, the process comprising:
   (a) homogenizing an aluminum alloy to form an homogenized aluminum alloy, the aluminum alloy comprising:
      up to about 0.15 of Si;
      between about 0.15 to about 0.30 of Fe;
      between about 0.9 to about 1.2 Mn;
      between about 0.03 and about 0.10 Mg;
      between about 0.10 and about 0.20 Zn;
      up to about 0.03 Cu;
      up to about 0.04 Ti; and
      the balance being aluminum and unavoidable impurities;
      wherein (Mg+Mn) is equal to or higher than about 0.99;
   (b) extruding the homogenized aluminum alloy into an extruded aluminum product;
   (c) optionally working the extruded aluminum product into a worked aluminum product; and
   (d) brazing the extruded aluminum product or the worked aluminum product to thereby form the extruded and brazed aluminum product,
      wherein the aluminum alloy in the extruded and brazed aluminum product has a greater corrosion resistance than a control extruded and brazed aluminum product made from aluminum alloy AA3003.

13. The process of claim 12, further comprising providing the aluminum alloy of step (a) as an extrusion ingot.

14. The process of claim 12, further comprising conducting the homogenizing of step (b) at a temperature between 580° C. and 620° C.

15. The process of claim 14, wherein step (b) further comprises a cooling step at about 400° C./h or less.

16. The process of claim 12, wherein step (c) further comprises drawing the extruded aluminum product, and the worked aluminum product is a drawn aluminum product.

17. An extruded and brazed aluminum product made by a process comprising:
   (a) homogenizing an aluminum alloy to form an homogenized aluminum alloy, the aluminum alloy comprising:
      up to about 0.15 of Si;
      between about 0.15 to about 0.30 of Fe;
      between about 0.9 to about 1.2 Mn;
      between about 0.03 and about 0.10 Mg;
      between about 0.10 and about 0.20 Zn;
      up to about 0.03 Cu;
      up to about 0.04 Ti; and
      the balance being aluminum and unavoidable impurities;
      wherein (Mg+Mn) is equal to or higher than about 0.99;
   (b) extruding the homogenized aluminum alloy into an extruded aluminum product;
   (c) optionally working the extruded aluminum product into a worked aluminum product; and
   (d) brazing the extruded aluminum product or the worked aluminum product to thereby form the extruded and brazed aluminum product, wherein the aluminum alloy in the extruded and brazed aluminum product has a greater corrosion resistance than a control extruded and brazed aluminum product made from aluminum alloy AA3003.

* * * * *